(12) United States Patent
Kobrin

(10) Patent No.: US 7,848,612 B2
(45) Date of Patent: Dec. 7, 2010

(54) PAUSING MEDIA PLAYBACK AT APPROPRIATE INTERVALS

(75) Inventor: Eric L. Kobrin, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1251 days.

(21) Appl. No.: 11/381,851

(22) Filed: May 5, 2006

(65) Prior Publication Data

US 2007/0258704 A1 Nov. 8, 2007

(51) Int. Cl.
*H04N 5/91* (2006.01)
*G11B 21/08* (2006.01)
*G11B 5/09* (2006.01)

(52) U.S. Cl. .................. 386/68; 386/69; 369/30.24; 369/47.11

(58) Field of Classification Search ............. 386/1, 386/46, 125, 126; 369/30.24, 47.11
See application file for complete search history.

(56) References Cited

U.S. PATENT DOCUMENTS

2002/0181938 A1* 12/2002 Tsumagari et al. ............ 386/95

* cited by examiner

*Primary Examiner*—Thai Tran
*Assistant Examiner*—Heather R Jones
(74) *Attorney, Agent, or Firm*—Cantor Colburn LLP

(57) ABSTRACT

A pause soon feature calls for providing media tags and pause points for pausing playback of media at appropriate intervals. The media tags and pause points may be resident in the media, the media player or in any combination thereof.

9 Claims, 3 Drawing Sheets

PAUSING MEDIA PLAYBACK AT APPROPRIATE INTERVALS

BACKGROUND OF THE INVENTION

1. Field of the Invention

This invention relates to video playback devices, and in particular to use of DVD for playback of commercially produced media.

2. Description of Prior Art

Sometimes when watching a DVD movie at home, one of the watchers will have to get up and go do something else for a while. This can happen because of bathroom breaks, laundry cycles finishing, cooking needing attention, etc. Pausing the movie at this point may inappropriately disrupt the flow of the story. The same thing happens with all similar media.

What is needed is a technique for locating convenient points in a recording for pausing playback.

SUMMARY OF THE INVENTION

The shortcomings of the prior art are overcome and additional advantages are provided through the provision of a pause soon feature disclosed herein.

Disclosed is a method for marking a media that includes loading the media into a marking device and selectively recording a plurality of media tags and a plurality of pause points for the media.

Also disclosed is a method for pausing a media during playback, the method including reading a media tag and listening for a pause point; wherein the media tag indicates information for locating a respective pause point and the pause point indicates a location for pausing of the media; and, pausing the media upon encountering the location for pausing the media.

Further disclosed is a method for pausing a media that is one of a videocassette and a digital versatile disc during playback, the method including using an on-screen menu, issuing a pause soon command to a player, the player reading a media tag and listening for a pause point; wherein the media tag indicates information for locating a respective pause point and the pause point indicates a location for pausing of the media; and, pausing the media upon encountering the location for pausing the media; wherein the media comprises content from at least one of an audio book, a sporting event, music, a movie, and television content; wherein the media tag is one of disposed in the media, disposed at the beginning of the media and maintained separately from the media; and wherein the pause point is one of disposed in the media and maintained separately from the media and the pause point is indicated by an index for the media.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
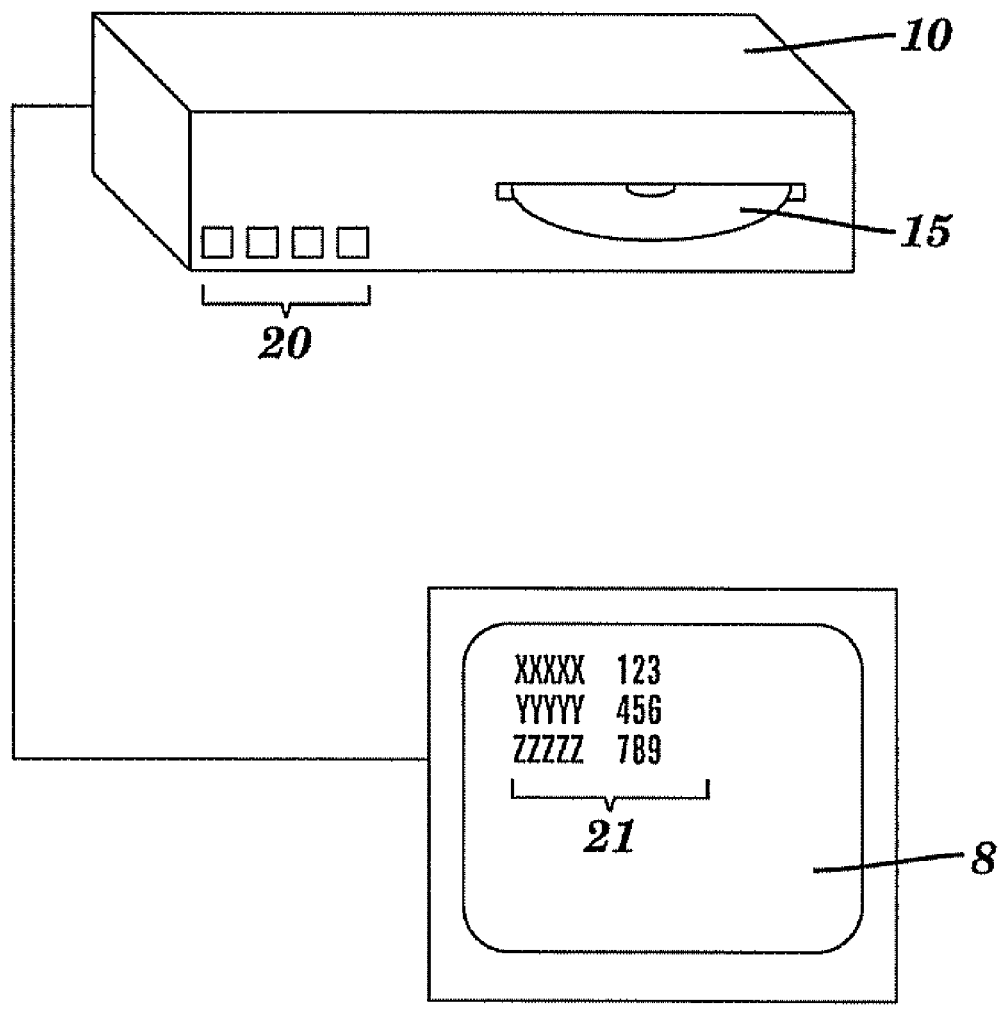
FIG. 1 illustrates one example of a video playback device.

Referring to FIG. 1, a video playback device 10 is shown. The video playback device 10, also referred to herein as a "player 10" may play digital versatile disc (DVD), videocassettes (VHS, betamax, etc, . . . ) or any other type of media 15. The player 10 includes various controls 20 for regulating playback of the media 15. The controls may be at least one of local (as depicted) and remote (not shown). Typically, the player 10 is coupled to and provides a signal to a display 8. In some embodiments, the display 8 provided includes an interactive on-screen menu 21 for control of the player 10.

Typically, the media 15 includes content produced by a commercial producer of content. Of course, media 15 is not limited to optical media 15, or even pre-recorded media 15. For example, media 15 may include feeds of media (such as via cable or satellite), and may include live broadcasts of content.

It is known by the creators of the content that at certain intervals, suitable points may arise for pausing of the content. Examples include a switching of scenes in a movie, and end of an inning, period or play, at the end of a song and others.

In order to enhance a playback of the media 15, a "pause soon" feature is provided in accordance with the teachings herein. The pause soon feature signals the player 10 to pause playback of the media 15 at the next appropriate moment, as decided by the content creator. This is analogous to a "stop request" used in bus transportation. The stop request can be submitted at any time, but will not occur until an appropriate stopping point has been reached.

The pause soon feature can be applied to any time-based media stream. It can be used for audio books (pause at next chapter or section break), music (pause at next track), television (use DVR to pause at next commercial break), etc.

The pause soon feature includes a system of media tags for marking pause points in the media 15, a system for modifying the tags in a playing stream, and a player technology for recognizing the media tags.

The media tags can take various forms. In a first form, a plurality of media tags are provided at the beginning of the media 15. In a second form, each media tag is encountered as playback of the media 15 occurs. Other forms of implementing the pause soon feature may be had, however, for simplicity and introduction, reference may be had to FIG. 2.

Figure 2A:
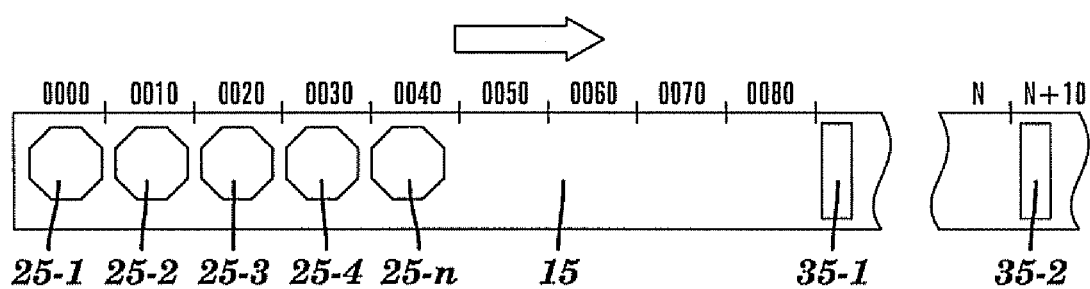
FIG. 2A and FIG. 2B, collectively referred to herein as FIG. 2, illustrate exemplary use of media tags with playback media.

In FIG. 2, aspects of media 15 are shown. The media has a direction of playback indicated by the arrow. The media 15 includes a plurality of media tags 25 and a plurality of pause points 35. Consider the embodiment depicted in FIG. 2A. In this embodiment, the plurality of media tags 25 are disposed at the beginning of the media 15. Once playback commences, the player 10 reads and loads the plurality of media tags 25. As playback continues, the player 10 encounters a plurality of pause points 35 in the media 15. Each of the pause points 35 being associated with a respective media tag 25.

In this embodiment, the player 10 typically maintains a counter (not shown), or some other form for indexing the media 15. Relying on the index, when a user wishes to pause playback at a particular point, the player 10 identifies the next available media tag 25. Playback is continued until the media 15 reaches the pause point 35, at which point the player 10 pauses the playback.

For example, and with reference to FIG. 2A, if a user wishes to pause soon, the user depresses a pause soon control 20. The player 10 then compares an index (e.g., counter) of the current playback to known media tags 25. If the player 10 identifies that playback has exceeded pause point 35-1, then the playback continues until pause point 35-2 is identified. When pause point 35-2 is identified, playback is paused.

Of course, the pause points 35 may be any type of signal embedded in the media 15, or no signal at all. In one embodiment, the plurality of pause points 35 include player 10 readable markers, each at the respective pause point 35. In another embodiment, each pause point 35 is actually related to an index (e.g., counter) that is tracked internally in the player 10.

One advantage of this embodiment includes providing an ability to determine the time remaining before the next pause point 35.

Figure 2B:
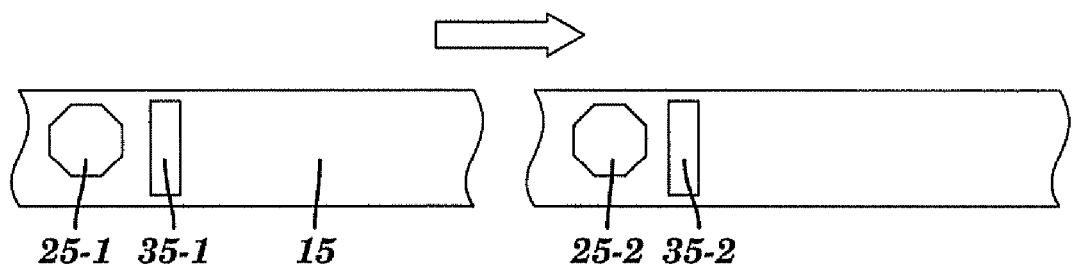

Another embodiment, shown in FIG. 2B, calls for disposing each of the media tags 25 and the pause points 35 through out the media 15. One advantage of this embodiment is that pausing of the media 15 is independent of the index, while another advantage permits use of the media tags 25 while commencing play at some intermediate portion of the media 15.

A number of other embodiments may be realized. For example, the player 10 may incorporate aspects of the pause soon feature. Consider a player 10 that includes connectivity with a media database through a network, such as the Internet. In these embodiments, a media recognition feature may initiate with the loading of the media, and automatically associate media tags 25 and pause points 35 (among other things) with the selected media 15.

A further embodiment involves an initial user review of the media 15. In this embodiment, the user conducts an initial viewing of the media 15 and manually adds pause points 35. The pause points 35 may be added directly to the media 15, or stored in memory of the player 10 and associated with the selected media 15. Typically, in such embodiments, the player 10 builds the plurality of media tags 25.

In other embodiments, the media tags 25 are maintained with the media 15 and readily accessed by the player 10. That is, a table of media tags 25 is maintained that is directly accessible (without commencing playback at the beginning of the media 15).

In some embodiments, pause points 35 are hard pause points 35. That is, in these embodiments, the player 10 automatically pauses playback of media 15, without submission of a user request. Embodiments for automatically pausing media 15 are typically useful for training media 15, presentation media 15 and the like.

Accordingly, the pause soon feature calls for providing media tags 25 and pause points 35 for pausing playback of media 15 at appropriate intervals. The media tags 25 and pause points 35 may be resident in the media 15, the media player 10 or in any combination thereof.

Figure 3:
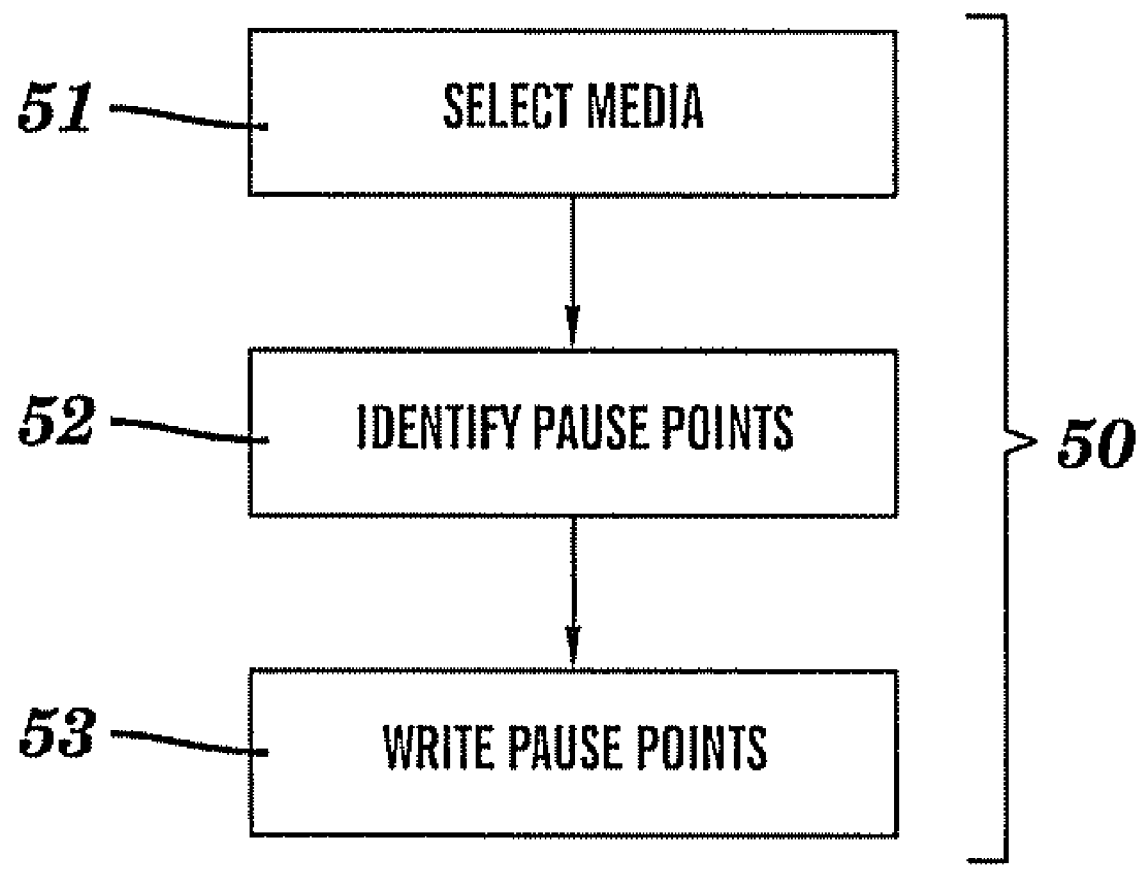
FIG. 3 provides a method for encoding media.

FIG. 3 provides an exemplary method for encoding media 50. Typically, encoding media 50 calls for selecting media 51, identifying pause points 52, and writing the pause points 53. Typically, writing pause points 53 calls for automated generation of media tags 25 by the player 10. Typically, writing pause points 53 occurs with at least an initial screening of the media 15.

As one example, one or more aspects of the present invention can be included in an article of manufacture (e.g., one or more computer program products) having, for instance, computer usable media. The computer usable media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

It should be noted that the player 10 is typically equipped as a marking device for recording at least one of the media tags 25 and the pause points 35. However, in some embodiments, the marking device does not provide for playback of the media 15. One example for the marking device wherein playback features are not included is a marking device such as would be useful for large volume manufacturing.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for pausing a media during playback, the method comprising:
   reading a media tag and listening for a pause point; wherein the media tag indicates information for locating a respective pause point and the pause point indicates a location for pausing of the media;
   issuing a pause soon command to a player, the pause soon command indicating to the player to pause current playback of the media at the next pause point and,
   pausing the media upon encountering the pause point location for pausing the media.

2. The method of claim 1, wherein the media comprises one of a videocassette and a digital versatile disc.

3. The method of claim 1, wherein issuing a pause soon command comprises using an on-screen menu.

4. The method of claim 1, wherein the media comprises at least one of live media and pre-recorded media.

5. The method of claim 1, wherein the media comprises content from at least one of an audio book, a sporting event, music, a movie, and television content.

6. The method of claim 1, wherein the media tag is one of disposed in the media, disposed at the beginning of the media and maintained separately from the media.

7. The method of claim 1, wherein the pause point is one of disposed in the media and maintained separately from the media.

8. The method of claim 1, wherein the pause point is indicated by an index for the media.

9. A method for pausing a media comprising one of a videocassette and a digital versatile disc during playback, the method comprising:
   using an on-screen menu, issuing a pause soon command to a player, the player:
   reading a media tag and listening for a pause point; wherein the media tag indicates information for locating a respective pause point and the pause point indicates a location for pausing of the media;

receiving a pause soon command at the player, the pause soon command indicating to the player to pause current playback of the media at the next pause point and, pausing the media upon encountering the pause point location for pausing the media; wherein the media comprises content from at least one of an audio book, a sporting event, music, a movie, and television content; wherein the media tag is one of disposed in the media, disposed at the beginning of the media and maintained separately from the media; and wherein the pause point is one of disposed in the media and maintained separately from the media and the pause point is indicated by an index for the media.

* * * * *